No. 718,556. PATENTED JAN. 13, 1903.
W. G. WARING.
METHOD OF MAKING PURE HYDROGEN SULFID FROM FURNACE GASES.
APPLICATION FILED JUNE 14, 1902.
NO MODEL.
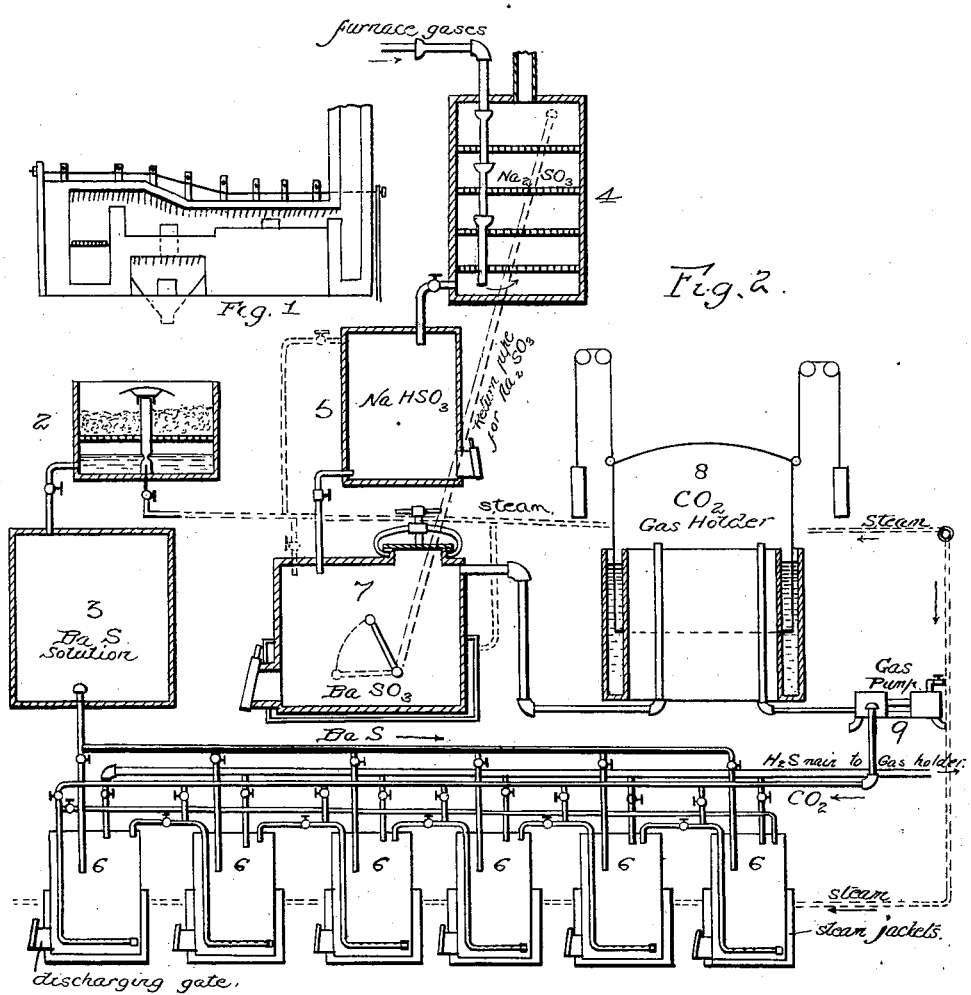

UNITED STATES PATENT OFFICE.

WILLIAM GEORGE WARING, OF TYRONE, PENNSYLVANIA.

METHOD OF MAKING PURE HYDROGEN SULFID FROM FURNACE-GASES.

SPECIFICATION forming part of Letters Patent No. 718,556, dated January 13, 1903.

Application filed June 14, 1902. Serial No. 111,754. (No specimens.)

*To all whom it may concern:*

Be it known that I, WILLIAM GEORGE WARING, a citizen of the United States, residing at Tyrone, Blair county, Pennsylvania, have invented certain new and useful Improvements in Methods of Making Pure Hydrogen Sulfid from Furnace-Gases, of which the following is a specification.

My improved method requires, in addition to the furnace-fumes or other source of sulfur dioxid, the following intermediate regenerative agents, to wit: (*a*) barium carbonate, which is to be made from heavy spar, as will be hereinafter described; (*b*) sodium sulfite, which is to be made from soda-ash, as will be described hereinafter.

In addition there is required fuel for the production of steam and for the calcination of barium sulfite and sulfate.

Briefly, the operations required and the chemical reactions involved in the process are as follows:

1. The fumes from the calcination of ores or other material giving rise to sulfur dioxid and containing other gases, such as nitrogen and the gaseous products of combustion, are led into a nearly-saturated solution of sodium sulfite, which I find has the property of completely absorbing $SO_2$ from mixed gases containing it in any proportion, the remaining gases (excepting such acid radicals as sulfuric anhydrid and hydrogen chlorid) passing through without being absorbed. The reaction involved is $$Na_2SO_3 + H_2O + SO_2 = 2NaHSO_3. \quad (I)$$

2. The solution of sodium hydrogen sulfite (sodium bisulfite or acid sulfite) so obtained is caused to act upon barium carbonate at a temperature approaching the boiling-point in a closed vessel, whereby complete decomposition of the carbonate is effected, with the production of insoluble barium sulfite and the elimination of carbon dioxid, while the sodium sulfite is regenerated, as per the following reaction:

$$2NaHSO_3 + BaCO_3 =$$
$$BaSO_3 + Na_2SO_3 + H_2O + CO_2. \quad (II)$$

The $CO_2$ is to be conducted to a gas holder or compressor.

3. The precipitate of barium sulfite is to be separated from the solution of sodium sulfite mixed with twenty-five to thirty per cent. of bituminous coal and reduced to barium sulfid by calcination in a reverberatory furnace.

4. The barium sulfid is dissolved out from the calcined product by means of hot water, 3.4 parts of water at 150° Fahrenheit being required to dissolve one part of BaS.

5. The hot solution of barium sulfid is to be decomposed in closed vessels, as will be described, by means of the carbon dioxid evolved from 2. The result of this decomposition is hydrogen sulfid, which is to be led by tubing to a gas-holder for use, while the barium-carbonate precipitate is collected and returned to 2.

The reactions involved in 5 I find to be the following:

$$2BaS + H_2O + CO_2 = BaS_2H_2 + BaCO_3. \quad (III)$$

$$BaS_2H_2 + H_2O + CO_2 = 2H_2S + BaCO_3. \quad (IV)$$

$$BaS + H_2S = 2BaS_2H_2. \quad (V)$$

Of these reactions I find that III and V proceed easily and thoroughly, even at ordinary temperatures, while IV requires a temperature near to the boiling-point, and the absorption of $CO_2$ is not complete until a moderate excess of the gas has passed through the solution. In order, therefore, to carry out these reactions successfully, I find it necessary to arrange the closed vessels in successive order and to conduct the admission and emission of the gases according to a systematic method of procedure which I shall now describe.

When a system of decomposition vessels is first charged with the BaS solution, the manner of admitting the $CO_2$ gas and collecting the evolved $H_2S$ differs somewhat from the regular routine in that at first the operations are so conducted as to conform with reactions IV and V, while later only the conditions of reactions VI and V are to be considered.

The accompanying drawings show an apparatus for carrying out the process, Figure 1 being a view of a reverberatory furnace for making BaS from $BaSO_3$ and coal, and Fig. 2 a diagrammatic view. In this last-named figure the numeral 2 designates a tank for lixiviating BaS; 3, a reservoir for holding solution of BaS; 4, a closed chamber with perforated floors for the absorption of sulfur fumes in solution of $Na_2SO_3$; 5, a reservoir for storage of $NaHSO_3$ obtained from chamber 4; 6 6, &c., closed generators for decomposition of BaS; 7, closed generator for decomposition of $BaCO_3$; 8, a gas-holder for $CO_2$, and 9 pump for forcing $CO_2$ into generator 6.

The decomposing vessels 6 are provided with steam jackets or bottoms for heating the solutions and with the necessary gas inlet and outlet pipes after the manner of Woulff bottles or "bombonnes," as well as with charging and discharging gates, valves, manometers, or other indicators. The amount of BaS charged into each vessel is as nearly as possible the same. The outlet of each vessel being connected with the inlet of the next, a volume of $CO_2$ equal to the amount required to effect reaction III upon a single charge of BaS is admitted into vessel No. 1 of the series. The amount required may be determined by a meter or by the pressure shown by the manometer or the indicator, the connecting-valve between Nos. 1 and 2 being closed. The inlet-valve is then closed and the same operation repeated with vessels Nos. 2, 3, 4, 5, and 6, when each vessel will contain one equivalent of baryta in solution, as sulfid, and another equivalent in the form of precipitated carbonate. The vessels being connected in series, the first vessel now receives a second charge of $CO_2$, and reaction IV takes place in No. 1, while in Nos. 2 and 3 occurs the reaction V. Owing to the retardation of reaction IV an excess of $CO_2$ is required in No. 1, so that it receives the equivalent of two charges of $CO_2$ before decomposition of the $BaS_2H_2$ is completed, so that *pari passu* with the occurrence of the reaction V in Nos. 2 and 3 they are affected by the reaction IV as well, while the reaction V extends into Nos. 4 and 5. Upon the appearance, therefore, of $H_2S$ at the exit-pipe of No. 5 the latter is connected with the $H_2S$ meter and gas-holder, and when reaction IV has been completed in No. 1 the outlet of No. 5 is connected with the inlet of No. 6, which is in turn connected with the gas-holder, and $CO_2$ is admitted into No. 2, while No. 1 is emptied and recharged to follow its turn after No. 6, and so on, the regular cycle of operations being now established.

As the above method of procedure seems somewhat similar to that of the well-known Chance process for the recovery of $H_2S$ from alkali waste, it should be observed that in point of fact there is no resemblance, either in the order in which the vessels are charged or in the purposes subserved. In my process pure carbon dioxid is necessarily employed in the decomposition, and consequently only pure hydrogen sulfid is evolved, so that no necessity arises for the elimination of any waste gases, which is the chief purpose of the Chance procedure, as explained in *Journal of the Society of Chemical Industry*, March, 1888, pages 210 and 162—namely, so to arrange the method of procedure that by taking advantage of reactions V and IV a large portion of the inert gases which accompany $CO_2$ in lime-kiln fumes may be eliminated, so as to secure a uniform flow of moderately-strong (thirty per cent.) $H_2S$ from the apparatus. In the present case, however, the $H_2S$ produced being unmixed with waste gases the necessity for operating a series of vessels in a definite order, as above outlined, arises only from the nature and relative speed of the several reactions involved, whereby they overlap, thus indicating the arrangement specified.

Losses in sodium sulfite ensue in operation 1 when the furnace-gases contain sulfuric anhydrid, resulting in the formation of sodium sulfate, which crystallizes out in acicular crystals. Such losses are to be made good by the addition of sodium carbonate (soda-ash) or caustic soda to the sulfite solution.

Losses of the barium carbonate employed in 2 are made up by the addition of an equivalent of heavy spar to the undissolved residues from the lixiviation of barium sulfid in 4, which are again submitted to the calcination of 3 after a preliminary subjection, if needful, to the action of sulfur fumes to sulfatize any carbonate produced in the previous calcination.

Theoretically one hundred parts of pure barium sulfate require 15.42 parts of pure carbon for its decomposition into 72.59 parts of barium sulfid. In practice nearly twice this proportion of carbon, as coal, is required, and the decomposition is never quite perfect, and the same is true of barium sulfite, of which 93.15 parts correspond to one hundred parts of the sulfate, so that an excess over the amount required by theory must be carried through the round of the operation. One hundred parts of pure barium sulfate or 93.15 parts of sulfite correspond in the reactions of this process to 84.55 parts of barium carbonate and 89.19 parts of sodium hydrogen sulfite, the reaction between these yielding 54.03 parts of sodium sulfite, 93.15 parts of barium sulfite, and 18.84 parts of carbon dioxid. The action of 27.44 parts of sulfur dioxid in 1 upon 54.03 parts of sodium sulfite again produces 89.19 parts of sodium hydrogen sulfite, while the action of 18.84 parts of carbon dioxid upon 72.59 parts of barium sulfid yields 14.575 parts of hydrogen sulfid and 84.55 parts of barium carbonate. From this it is to be seen that the process is regenerative.

I claim—

The herein-described method of converting sulfur dioxid contained in furnace-gases, or in other admixture, into pure hydrogen sulfid which consists in absorbing the sulfur dioxid in a strong solution of sodium sulfite, combining the sulfur dioxid so absorbed with barium, by means of reacting upon barium carbonate with the acid sodium sulfite so produced; storing the evolved pure carbon dioxid; reducing the barium sulfite thus produced to barium sulfid by means of calcination with coal, and finally causing the carbon dioxid stored as described to react upon the said barium sulfid, so as to produce hydrogen sulfid, with regeneration of the barium carbonate, substantially as described.

In testimony whereof I affix my signature in presence of two witnesses.

WILLIAM GEORGE WARING.

Witnesses:
A. M. HULL,
GUY H. WARING.